United States Patent [19]

Rudert et al.

[11] 4,018,053
[45] Apr. 19, 1977

[54] METHOD AND APPARATUS FOR OPERATING AN INTERNAL COMBUSTION ENGINE WITH AN EXHAUST GAS TURBO-CHARGER AND A COMBUSTION CHAMBER

[75] Inventors: Wolfgang Rudert, Langenargen; Robert Schulmeister, Friedrichshafen, both of Germany; Manfred Schlaupitz, Kongsberg, Norway; Norbert Braetsch, Friedrichshafen, Germany

[73] Assignee: Motoren- und Turolnen-union Friedrichshafen GmbH, Germany

[22] Filed: Aug. 1, 1975

[21] Appl. No.: 601,331

[30] Foreign Application Priority Data

Aug. 8, 1974 Germany .................... 2438162

[52] U.S. Cl. .................... 60/606; 60/605
[51] Int. Cl.² .................... F02B 33/44
[58] Field of Search ............ 60/599, 605, 606, 614, 60/615, 619, 598

[56] References Cited

UNITED STATES PATENTS

| 2,580,591 | 1/1952 | Pouit | 60/606 |
|---|---|---|---|
| 2,608,051 | 8/1952 | Nehel | 60/606 |
| 3,096,615 | 7/1963 | Zuhn | 60/606 |
| 3,163,984 | 1/1965 | Dumont | 60/606 |
| 3,775,971 | 12/1973 | Gadefelt | 60/598 |

Primary Examiner—Ronald H. Lazarus
Attorney, Agent, or Firm—Craig & Antonelli

[57] ABSTRACT

A method and apparatus for operating an internal combustion engine equipped with an exhaust gas turbo-supercharger and with a combustion chamber which supplies additional gas to the exhaust gas turbine; during idling of the internal combustion engine, the combustion chamber is operated at such partial output that with lowest possible fuel consumption of the combustion chamber, an increased starting-supercharged air-pressure, as necessary for as favorable a load acceptance behavior as possible, will establish itself in the supercharged air lines whereas during the acceleration of the internal combustion engine, the output of the combustion chamber is increased for a rapid increase of the supercharged air pressure in the supercharged air line in order to attain a spontaneous load acceptance behavior of the internal combustion engine; during a further increase of the supercharged air pressure in the supercharged air line, initiated by the increasing exhaust gas supply with an increasing internal combustion engine output, the output of the combustion chamber is then again correspondingly reduced.

33 Claims, 1 Drawing Figure

U.S. Patent    April 19, 1977    4,018,053
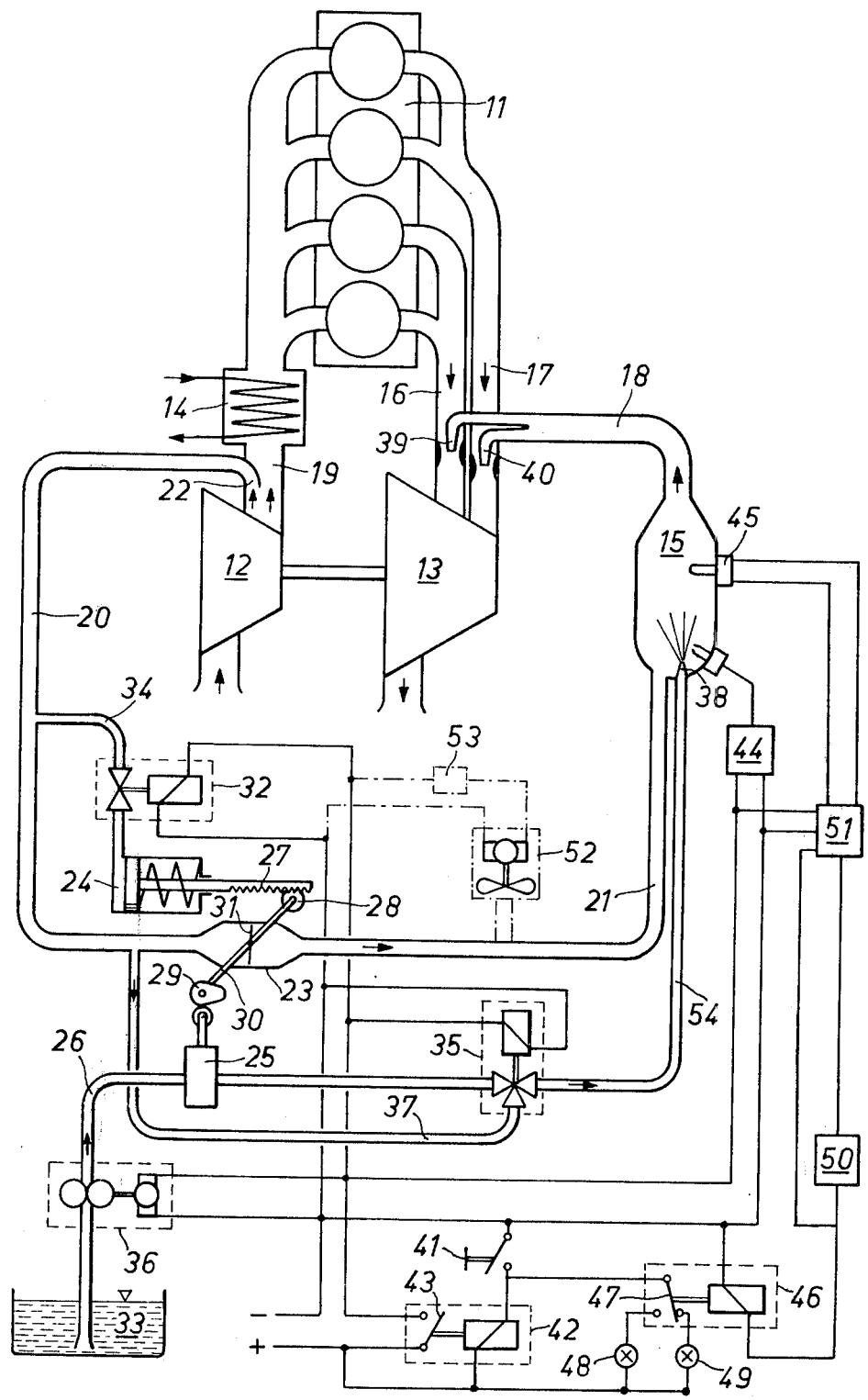

METHOD AND APPARATUS FOR OPERATING AN INTERNAL COMBUSTION ENGINE WITH AN EXHAUST GAS TURBO-CHARGER AND A COMBUSTION CHAMBER

The present invention relates to a method for the operation of an internal combustion engine equipped with an exhaust gas turbo-supercharger and with a combustion chamber which supplies additional gas to the exhaust gas turbine of the supercharger, and to an apparatus for carrying out this method.

In an internal combustion engine which is equipped is such manner, it is possible to operate the freely running exhaust gas turbo-supercharger with the aid of the combustion chamber independently of the exhaust gas supply of the internal combustion engine and by the application of higher supercharging pressures to increase the power output of the internal combustion engine beyond that which is attainable with normal supercharging.

Supercharged internal combustion engines with such high outputs have proved satisfactory with drives having a constant load or a load which remains essentially constant over longer periods of time or time intervals.

However, it becomes problematical if a supercharged internal combustion engine has to adapt itself in a short period of time to sudden load changes requiring an output increase, as for example, in the operation of heavy trucks. As a result of the inerita of the system "internal combustion engine-exhaust gas turbo-supercharger", the transistion during the load assumption or load acceptance from idling to maximum output last considerably longer than is known with internal combustion engines without supercharging.

The object of the present invention is therefore to provide a method and the apparatus necessary therefor in order to improve the load acceptance or assumption behavior of a supercharged internal combustion engine and to enable starting of the combustion chamber during all operating conditions of the internal combustion engine.

The underlying problems are solved according to the present invention in that during idling of the internal combustion engine, the combustion chamber is operated with such a partial output than an increased, starting supercharging air pressure, as required for as favorable as possible a load acceptance behavior, will be established in the supercharging air line with a fuel consumption of the combustion chamber which is as low as possible, that during the accleration of the internal combustion engine, the power output of combustion chamber is increased for a rapid increase of the supercharging air pressure in the supercharging air line in order to attain a spontaneous load acceptance behavior of the internal combustion engine, and that with a further increase of the supercharged air pressure in the supercharged air line, the output of the combustion chamber is correspondingly reduced, initiated by the increasing exhaust gas supply with an increasing internal combustion engine output.

As a result of these measures, a similar configuration of the power output characteristic curve is achieved with a supercharged internal combustion engine as with an internal combustion engine without supercharging so that with a vehicle drive system, a correspondingly good behavior during the acceleration results in the driving operation.

According to a further feature of the present invention, the combustion chamber is continued to be operated exclusively with a slight readiness partial output when the exhaust gas energy of the internal combustion engine alone suffices to produce the maximum supercharged air pressure so that the fuel consumption by the combustion chamber is not increased beyond the extent absolutely necessary.

An apparatus required for carrying out the method in accordance with the present invention essentially consists according to the present invention of an automatic control installation for the combustion chamber whose sole control magnitude is the supercharged air pressure.

According to the present invention a throttling and closure device in the air supply line in the air supply line to the combustion chamber and a fuel adjusting device mechanically coupled therewith in the fuel line to the combustion chamber are adjusted by an adjusting cylinder acted upon by the supercharged air pressure. The throttle and closure device is constructed according to the present invention as rotatable valve or flap which is adjusted by the adjusting cylinder by means of a toothed rack and a pinion and which carries out with a complete adjusting cylinder stroke a rotation of about 180° about its axis.

The fuel-adjusting device is actuated according to the present invention by a cam disk on the shaft of the rotatable valve.

Another mechanism required for realizing the method of the present invention essentially consists according to the present invention of a three-way valve, especially of a three-way solenoid valve which is connected in the fuel supply line to the combustion chamber downstream of the fuel-adjusting device and which in one of the two possible positions permits the passage of fuel to the combustion chamber whereas it closes off the fuel supply in the other position when the combustion chamber is not operative and establishes the connection with an air line whereby a coking of the injection installation in the combustion space is prevented by blowingout or scavenging any residual fuel and residual gases are removed out of the combustion chamber.

In order to combine and to mix the combustion chamber gases and the exhaust gases from the internal combustion engine, a further device for carrying out the method according to the present invention consists of an injector which is arranged in the exhaust gas manifold or common exhaust gas line shortly upstream of the inlet aperture of the exhaust gas turbine.

In an internal combustion engine with a multi-flow path or multi-channel exhaust gas manifold or common exhaust gas line, one injector for the supply of the combustion chamber gases is coordinated according to the present invention to each channel. As a result thereof, the pressure conditions in the exhaust gas manifold or common exhaust gas line required for the efficient processing of the combustion chamber exhaust gases in the exhaust gas turbine are not changed.

A further feature of the present invention resides in such a construction of the adjusting mechanism of the rotatable valve that the throttle and closure device opens to its full cross section as soon as the combustion chamber is started in order that the air coming from the supercharged air line flows unthrottled to the combustion chamber and the readiness of the combustion chamber is reached rapidly.

In order to branch off a sufficient amount of air to the combustion chamber also with a low starting supercharged air pressure in the supercharged air line, the air supply to the combustion chamber commences according to the present invention at a pressure tube or Pitot tube arranged in the supercharged air line so that a pressure sufficient to overcome the line resistances can be achieved in the air feed line to the combustion chamber.

The air necessary for the starting of the combustion chamber can also be supplied according to the present invention by a blower or compressor so that the combustion chamber can be started completely independently of the operating condition of the internal combustion engine.

According to the present invention, the internal combustion engine operation with or without combustion chamber assist can be selected at will by means of a switching circuit installation.

In order to obtain during the starting of the combustion chamber a control about the operating condition thereof, a control installation is provided according to the present invention at which during the ignition period of the combustion chamber, two lights of different color alternately blink or light up intermittently and after completed ignition of the combustion chamber only one light is energized continuously and in case of an operating defect or trouble only the other light is energized continuously.

The advantages achieved with the present invention reside especially in that in connection with vechicle drives, short acceleration periods are attainable thereby also with supercharged internal combustion engine, that with a combustion chamber operation only a slight addition al fuel consumption is required, that a simple control will result which operates without external energy, and that as a result of the simple construction, the method can be applied also in case of constricted installation conditions.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of an internal combustion engine with an exhaust gas turbo-supercharger and a combustion chamber as well as the associated control system in accordance with the present invention.

Referring now to the single FIGURE of the drawing, an internal combustion engine 11 is equipped with a supercharger 12 which is driven by an exhaust gas turbine 13, with a supercharged air cooler 14 and with a combustion chamber 15 supplying additional gas to the exhaust gas turbine 13.

The combustion air necessary for the combustion chamber 15 is tapped off from the supercharged air line 19 between the supercharger 12 and the supercharger air cooler 14 with the aid of a pressure tube or Pitot tube 22 and is fed to the combustion chamber 15 by way of an air feed line 20, 21.

A throttle and closure mechanism 23 constructed as rotatable flap or valve 31 which regulates the supply of combustion air to the combustion chamber 15, is arranged in the air supply line or feed line 20, 21.

A pneumatic adjusting cylinder 24 adjusts the throttle and closure mechanism 23 by means of a toothed rack 27 which engages with a pinion 28 that is secured together with the flap 31 on the shaft 30. The flap or valve 31 thereby carries out a rotation of about 180° during a full adjusting stroke of the cylinder 24.

A fuel-adjusting device 25 arranged in the line 26 regulates the fuel supply to the combustion chamber 15. The fuel-adjusting device 25 is actuated by a cam disk 29 on the shaft 30, whence a mechanical coupling of the throttle and closure mechanism 23 and of the fuel-adjusting device 25 results.

The adjusting cylinder 24, the throttle and closure mechanism 23 and the fuel-adjusting device 25 form together an automatic control installation for the combustion chamber, whose sole control magnitude is the air pressure out of the air supply line 20 which is supplied to the adjusting cylinder 24 by way of a line 34.

A solenoid valve 32 is arranged in the line 34 for controlling the air supply to the adjusting cylinder 24 which closes the line 34 when the valve solenoid is de-energized.

An electrically operated pump 36 supplies the combustion chamber 15 with fuel, which is sucks-in out of a supply tank 33 or out of the fuel supply system of the internal combustion engine 11. The fuel quantity is thereby controlled by the fuel-adjusting device 25 is dependence on the position of the valve 31 whereas a three-way solenoid valve 35 of conventional construction in the line 26 controls the fuel supply to the combustion chamber 15. With a de-energized three-way solenoid valve 35, the fuel supply to the combustion chamber 15 is blocked, however, a connection is opened between an air line 37, which branches off from the air feed line 20 upstream of the throttle and closure mechanism 23, and the combustion chamber 15 so that the fuel line 54, the injection device 38 and the combustion chamber 15 are scavenged with air when the combustion chamber 15 is out of operation, i.e., does not operate. As a result thereof, residual gases are blown out of the combustion chamber 15 and a coking of the injection device 38 is avoided.

A line 18 connects the combustion chamber 15 with the common exhaust gas line 16, 17 which in the illustrated embodiment is constructed of multi-flow path or multi-channel type. For combining and mixing the combustion chamber gases and the exhaust gases out of the combustion chamber 11, one injector 39, 40 each is arranged in each channel of the common exhaust gas line or manifold 16, 17 shortly upstream of the inlet opening of the exhaust gas turbine 13. The pressure conditions which result in the common exhaust gas line 16, 17 during the sole operation of the internal combustion engine 11 and which are important for a high power yield in the exhaust gas turbine, are not disturbed by the injectors 39 and 40 when the combustion chamber 15 is additionally operated.

The internal combustion engine operation can be selected at will with or without combustion chamber assist by a switching installation which includes a switch 41 and a relay 42. With an opened switch 41, the coil of the relay 42 is de-energized, the contact 43 actuated by the relay 42 is opened and therewith the combustion chamber 15 is inoperative. If the switch 41 is closed, the relay 42 is energized and the switch 43 also closes so that voltage is applied to the solenoid valves 32 and 35, to the pump 36 and to the ignition device 44 as well as to the timer switch 51 and the combustion chamber 15 is able to start.

In order to be able to monitor the starting operation of the combustion chamber 15, a control installation is provided according to the present invention which consists of a relay 46 with a two-position contact 47, of two lights of different color, for example, of a green light 48 and of a red light 49, of a flame monitor 45, of an interrupter 50 and of the timer switch 51. With a de-energized relay 46, the red light 49 is connected with the voltage source by way of the switching contact 47 whereas with an energized relay 46 the green light 48 is connected with the voltage source by way of the switching contact 47. During the ignition period, as least as long until the combustion chamber 15 has ignited, the relay 46 is energized and again de-energized by way of the interrupter device 50 of conventional construction so that the lights 48 and 49 blink alternately, i.e., light up intermittently and alternately. If the combustion chamber 15 does not ignite within the time interval adjusted at the timer device 51, then the relay 46 becomes de-energized and the red light 49 will light up continuously. With a successful ignition of the combustion chamber 15 the interrupting device 50 is by-passed by the feedback of the flame monitor 45 to the timer switch 51 and the relay 46 is energized so that the green light 48 lights up continuously.

For purposes of starting, it is necessary at first that air is supplied to the combustion chamber 15. With a sufficient supercharged air pressure in the supercharged air line 19, this operation takes place automatically by means of the installations described hereinabove. If, however, the supercharged air pressure is too low so that the adjusting cylinder 24 cannot carry out a stroke, the supercharger 12 has to be adjusted for a short period of time to a higher rotational speed by an acceleration of the internal combustion engine 11 during normal operation, i.e., without combustion chamber assist, in order that a supercharged air pressure sufficient for the starting of the combustion chamber 15 will establish itself in the supercharged air line 19. Since the controls necessary for accelerating the internal combustion engine for such short period of time as a function of the supercharged air pressure in the line 19 involve conventional means, known as such in the art, a detailed description and showing thereof is dispensed with herein.

However, it is also possible to provide additionally an electrically operated blower 52 which during the starting of the combustion chamber 15 supplies the combustion chamber 15 with combustion air independently of this supercharged air pressure in the supercharged air line 19. A pressure switch 53 responsive to the supercharged air pressure again turns off the blower 52 as soon as a predetermined supercharged air pressure is attained.

In order to further improve the starting of the combustion chamber 15, the adjusting mechanism for the rotatable valve 31 may be so constructed that the throttle and closure device 23 opens, during the starting period, immediately to its full flow cross section by means of an electric drive in order that the air coming from the supercharged air line 19 is able to flow unthrottled to the combustion chamber 15. After the aforementioned supercharged air pressure is reached, this electric drive is then also turned off by the pressure switch 53.

After a successful start, the combustion chamber 15 is operated during idling of the internal combustion engine 11 with such a partial output that with as low a fuel consumption of the combustion chamber 15 as possible, an increased, starting supercharged air pressure in the supercharged air line 19 will establish itself which is necessary for a load-acceptance behavior that is as favorable as possible. During the acceleration of the internal combustion engine 11 the output of the combustion chamber 15 is increased for a rapid increase of the supercharged air pressure in the supercharged air line 19 in order to obtain a spontaneous load assumption or load acceptance behavior of the internal combustion engine 11. During a further increase of the supercharged air pressure in the supercharged air line 19, the output of the combustion chamber 15 is correspondingly reduced, initiated by the increasing exhaust gas supply with an increasing internal combustion engine output.

As a result of these measures, a similar configuration of the power characteristic curve is attained with a supercharged internal combustion engine as with an internal combustion engine without supercharging so that with a vehicle drive a corresponding behavior will result during accleration in the course of the vehicle operation.

If the exhaust gas energy of the internal combustion engine 11 alone suffices to produce the maximum supercharged air pressure, then the combustion chamber 15 is continued to be operated exclusively with a partial readiness output so that the additional fuel consumption by the combustion chamber 15 is not increased above that absolutely necessary.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for operating an internal combustion engine, the engine includes an exhaust gas turbo-supercharger having an exhaust gas turbine, a combustion chamber means for supplying additional gas to the exhaust gas turbine of the supercharger, and an air line means for supplying supercharged air from the supercharger to the combustion chamber means, the method comprising the steps of operating the combustion chamber with a low fuel consumption at a partial output such that an increased starting supercharging air pressure favorable for a load acceptance behavior of the internal combustion engine is established in the air line means during an idling of the internal combustion engine increasing the output of the combustion chamber during an acceleration of the internal combustion engine for a rapid increase of the supercharged air pressure in the air line means to obtain a substantially spontaneous load acceptance behavior of the internal combustion engine, and reducing the output of the combustion chamber during a further increase of the supercharged air pressure in the air line means.

2. A method according to claim 1, wherein the step of operating the combustion chamber means includes exclusively maintaining a slight readiness partial load in the combustion chamber means when the exhaust gas energy of the internal combustion engine suffices alone to produce a maximum supercharged air pressure in the air line means.

3. An internal combustion engine including an exhaust gas turbo-supercharger means having an exhaust gas turbine, a combustion chamber means for supplying additional gas to the exhaust gas turbine of the supercharger means, air line means for supplying supercharged air from the supercharger means to the combustion chamber means, characterized in that a control means is provided for controlling the combustion chamber means including means for operating the combustion chamber means with a low fuel consumption at a partial output during an idling operation of the internal combustion engine such that an increased starting supercharged air pressure necessary for a favorable load acceptance behavior of the internal combustion engine is established in the air line means, means for increasing the output of the combustion chamber means during acceleration of the internal combustion engine for a rapid increase of te supercharged air pressure in the air line means to obtain a substantially spontaneous load acceptance behavior of the internal combustion engine, and means for reducing the output of the combustion chamber means during a further increase of the supercharged air pressure in the air line means caused by an increasing exhaust gas supply with an increasing internal combustion engine output.

4. An internal combustion engine according to claim 3, characterized in that the control means further includes means for exclusively maintaining a slight readiness partial output at the combustion chamber means when the exhaust gas energy of the internal combustion engine suffices alone to produce substantially the maximum supercharged air pressure in the air line means.

5. An internal combustion engine according to claim 3, characterized in that the control means includes a means for measuring the supercharged air pressure in the air line means, the measured air pressure constituting the sole control magnitude of the control means.

6. An internal combustion engine including an exhaust gas turbo-supercharger means having an exhaust gas turbine, a combustion chamber means for supplying additional gas to the exhaust gas turbine of the supercharger means, air line means for supplying supercharged air from the supercharged means to the combustion chamber means, characterized in that a control means is provided for controlling the combustion chamber means including means for operating the combustion chamber means with a low fuel consumption at a partial output during an idling operation of the internal combustion engine such that an increased starting supercharged air pressure necessary for a favorable load acceptance behavior of the internal combustion engine is established in the air line means, means for increasing the output of the combustion chamber means during acceleration of the internal combustion engine for a rapid increase of the supercharged air pressure in the air line means to obtain a substantially spontaneous load acceptance behavior of the internal combustion engine, means for reducing the output of the combustion chamber means during a further increase of the supercharged air pressure in the air line means caused by an increasing exhaust gas supply with an increasing internal combustion engine output, an air supply line is interposed between the air line means and the combustion chamber means, a throttle and closure means is arranged in the air supply line, a fuel supply line means is provided for supplying fuel to the combustion chamber means, and in that the control means includes a means for measuring the supercharged air pressure in the air line means, the measured air pressure constituting the sole control magnitude of the control means, and in that the control means includes an adjusting cylinder means for adjusting the throttling and closure means and a fuel-adjusting means arranged in the fuel supply line means for adjusting the supply of fuel to the combustion chamber means, said adjusting cylinder means being acted upon by the air pressure in the air supply line.

7. An internal combustion engine according to claim 6, characterized in that means are provided for mechanically coupling the fuel-adjusting means with the throttling and closure means.

8. An internal combustion engine according to claim 6, characterized in that the throttling and closure means includes rotatable valve means, means are provided for connecting said rotatable valve means to the adjusting cylinder means such that said rotatable valve means carries out a predetermined rotation about its axis during a full stroke of the adjusting cylinder means.

9. An internal combustion engine according to claim 8, characterized in that the connecting means includes a toothed rack and pinion, and in that said rotatable valve means carries out a rotation of approximately 180° during a full stroke of the adjusting cylinder means.

10. An internal combustion engine according to claim 8, characterized in that the rotatable valve means includes a shaft, and in that said mechanical coupling means includes a cam disk mounted on the shaft of the rotatable valve means.

11. An internal combustion engine according to claim 8, characterized in that a three-way valve means is arranged in the fuel supply line downstream of the fuel-adjusting means, said three-way valve means being operable in one position to permit the flow of fuel to the combustion chamber means and operable in another position with a non-used combustion chamber means to close off the fuel supply to the combustion chamber means while permitting the flow of air through the fuel supply line leading to the combustion chamber means.

12. An internal combustion engine according to claim 11, characterized in that the three-way valve means is a solenoid valve.

13. An internal combustion engine according to claim 11, characterized in that the engine includes exhaust gas line means, an injector means is arranged in the exhaust gas line means shortly upstream of the inlet opening of the exhaust gas turbine for combining and mixing the combustion chamber gases and the exhaust gases stemming from the internal combustion engine.

14. An internal combustion engine according to claim 13, characterized in that the exhaust gas line means is a multi-channel common exhaust gas line means, and in that one injector means for combining and mixing the combustion chamber gases is coordinated to each channel of the multi-channel exhaust gas line means.

15. An internal combustion engine according to claim 13, characterized in that the adjusting cylinder means opens the rotatable valve means substantially to its full cross section as soon as the combustion chamber means is started whereby the supercharged air supplied by the air line means flow unthrottled into the combustion chamber means.

16. An internal combustion engine according to claim 13, characterized in that said measuring means is a pressure tube means arranged in the air line means at a position where the air supply line enters the air line means.

17. An internal combustion engine according to claim 15, characterized in that a blower means is provided for supplying combustion air necessary for starting the combustion chamber means.

18. An internal combustion engine according to claim 13, characterized in that a switching means is operatively connected with said control means for selecting at will the operation of the internal combustion engine with or without an assist from the combustion chamber means.

19. An internal combustion engine according to claim 18, characterized in that means are provided for monitoring the operating conditions of the combustion chamber means including at least two lights of different color, said monitoring means including means for causing the two lights to blink alternately during an ignition period of the combustion chamber means and for continuously lighting only one of the two lights after a completed ignition of the combustion chamber means and for continuously lighting only the other of the two lights in case of an operating trouble.

20. An internal combustion engine according to claim 3, characterized in that the control means further includes means for exclusively maintaining a slight readiness partial output at the combustion chamber means when the exhaust gas energy of the internal combustion engine suffices alone to produce substantially the maximum supercharged air pressure in the air line means.

21. An internal combustion engine including an exhaust gas turbo-supercharger means having an exhaust gas turbine, a combustion chamber means for supplying additional gas to the exhaust gas turbine of the supercharger means, air line means for supplying supercharged air from the supercharger means to the combustion chamber means, characterized in that a control means is provided for controlling the combustion chamber means including means for operating the combustion chamber means with a low fuel consumption at a partial output during an idling operation of the internal combustion engine such that an increased starting supercharged air pressure necessary for a favorable load acceptance behavior of the internal combustion engine is established in the air line means, means for increasing the output of the combustion chamber means during acceleration of the internal combustion engine for a rapid increase of the supercharged air pressure in the air line means to obtain a substantially spontaneous load acceptance behavior of the internal combustion engine, means for reducing the output of the combustion chamber means during a further increase of the supercharged air pressure in the air line means caused by an increasing exhaust gas supply with an increasing internal combustion engine output, an air supply line is interposed between the air line means and the combustion chamber means, a throttle and closure means is arranged in the air supply line, a fuel supply line means is provided for supplying fuel to the combustion chamber means, and in that the control means includes an adjusting cylinder means for adjusting the throttling and closure means and a fuel-adjusting means arranged in the fuel supply line means for adjusting the supply of fuel to the combustion chamber means, said adjusting cylinder means being acted upon by the air pressure in the air supply line.

22. An internal combustion engine according to claim 21, characterized in that means are provided for mechanically coupling the fuel-adjusting means with the throttling and closure means.

23. An internal combustion engine according to claim 21, characterized in that the throttling and closure means includes rotatable valve means, means are provided for connecting said rotatable valve means to the adjusting cylinder means such that said rotatable valve means carries out a predetermined rotation about its axis during a full stroke of the adjusting cylinder means.

24. An internal combustion engine according to claim 23, characterized in that the connecting means includes a toothed rack and pinion, and in that said rotatable valve means carries out a rotation of approximately 180° during a full stroke of the adjusting cylinder means.

25. An internal combustion engine according to claim 23, characterized in that the rotatable valve means includes a shaft, and in that said mechanical coupling means includes a cam disk mounted on the shaft of the rotatable valve means.

26. An internal combustion engine according to claim 3, characterized in that a three-way valve means is arranged in the fuel supply line downstream of the fuel-adjusting means, said three-way valve means being operable in one position to permit the flow of fuel to the combustion chamber means and operabl,e in another position with a non-used combustion chamber means to close off the fuel supply to the combustion chamber means while permitting the flow of air through the fuel supply line leading to the combustion chamber means.

27. An internal combustion engine according to claim 3, characterized in that the engine includes exhaust gas line means, an injector means is arranged in the exhaust gas line means shortly upstream of the inlet opening of the exhaust gas turbine for combining and mixing the combustion chamber gases and the exhaust gases stemming from the internal combustion engine.

28. An internal combustion engine according to claim 27, characterized in that the exhaust gas line means is a multi-channel common exhaust gas line means, and in that one injector means for combining and mixing the combustion chamber gases is coordinated to each channel of the multi-channel exhaust gas line means.

29. An internal combustion engine according to claim 23, characterized in that the adjusting cylinder means opens the rotatable valve means substantially to its full cross section as soon as the combustion chamber means is started whereby the supercharged air supplied by the air line means flows unthrottled into the combustion chamber means.

30. An internal combustion engine according to claim 3, characterized in that said measuring means is a pressure tube means arranged in the air line means at a position where the air supply line enters the air line means.

31. An internal combustion engine according to claim 3, characterized in that a blower means is provided for supplying combustion air necessary for starting the combustion chamber means.

32. An internal combustion engine including an exhaust gas turbo-supercharger means having an exhaust gas turbine, a combustion chamber means for supplying additional gas to the exhaust gas turbine of the supercharger means, air line means for supplying supercharged air from the supercharger means to the combustion chamber means, characterized in that a control means is provided for controlling the combustion chamber means including means for operating the combustion chamber means with a low fuel consumption at a partial output during an idling operation of the internal combustion engine such that an increased starting supercharged air pressure necessary for a favorable load acceptance behavior of the internal combustion engine is established in the air line means, means for increasing the output of the combustion chamber means during acceleration of the internal combustion engine for a rapid increase of the supercharged air pressure in the air line means to obtain a substantially spontaneous load acceptance behavior of the internal combustion engine, means for reducing the output of the combustion chamber means during a further increase of the supercharged air pressure in the air line means caused by an increasing internal combustion engine output, and in that a switching means is operatively connected with said control means for selecting at will the operation of the internal combustion engine with or without an assist from the combustion chamber means.

33. An internal combustion engine according to claim 3, characterized in that means are provided for monitoring the operating conditions of the combustion chamber means including at least two lights of different color, said monitoring means including means for causing the two lights to blink alternately during an ignition period of the combustion chamber means and for continuously lighting only one of the two lights after a completed ignition of the combustion chamber means and for continuously lighting only the other of the two lights in case of an operating trouble.

* * * * *

UNITED STATES PATENT OFFICE
CERTIFICATE OF CORRECTION

Patent No. 4,018,053  Dated April 19, 1977

Inventor(s) Wolfgang Rudert, et al.

It is certified that error appears in the above-identified patent and that said Letters Patent are hereby corrected as shown below:

Title page as it now reads:

[73]     Assignee: Motoren- und Turolnen-union
                   Friedrichshafen GmbH, Germany Title page as it should read:

[73]     Assignee: Motoren- und Turbinen-Union
                   Friedrichshafen GmbH, Germany Signed and Sealed this twenty-third Day of August 1977

[SEAL]

Attest:

RUTH C. MASON
Attesting Officer

C. MARSHALL DANN
Commissioner of Patents and Trademarks